United States Patent
Tseng et al.

(10) Patent No.: US 8,944,629 B2
(45) Date of Patent: Feb. 3, 2015

(54) POWER GENERATING DEVICE

(76) Inventors: Shen-Ko Tseng, Taipei (TW);
Juinne-Ching Liao, Daxi Township,
Taoyuan County (TW)

(*) Notice: Subject to any disclaimer, the term of this patent is extended or adjusted under 35 U.S.C. 154(b) by 264 days.

(21) Appl. No.: 13/253,968

(22) Filed: Oct. 6, 2011

(65) Prior Publication Data

US 2012/0056563 A1    Mar. 8, 2012

(30) Foreign Application Priority Data

Aug. 10, 2010   (CN) .......................... 2010 1 0299300

(51) Int. Cl.
| | |
|---|---|
| B60Q 1/00 | (2006.01) |
| B60Q 1/26 | (2006.01) |
| F21L 13/00 | (2006.01) |
| F21L 4/00 | (2006.01) |
| H02J 7/00 | (2006.01) |
| H02K 35/02 | (2006.01) |
| H02K 35/04 | (2006.01) |

(52) U.S. Cl.
CPC ................ *H02K 35/02* (2013.01); *H02K 35/04* (2013.01)
USPC ............ 362/192; 362/196; 362/193; 320/108

(58) Field of Classification Search
CPC ... H02K 35/02; H02K 35/04; H02K 11/0094; H02N 2/18; H02N 2/183; F21L 4/08; F21L 14/08; B60L 8/00
USPC .......... 362/192, 196, 183, 193, 119; 320/108; 315/363, 285, 283, 284, 286; 336/83, 336/212; 290/1 R
See application file for complete search history.

(56) References Cited

U.S. PATENT DOCUMENTS

| | | | | | |
|---|---|---|---|---|---|
| 1,472,335 | A | * | 10/1923 | Luzy ............................. | 362/192 |
| 6,291,901 | B1 | * | 9/2001 | Cefo ............................. | 290/1 R |
| 7,088,222 | B1 | * | 8/2006 | Dueker et al. ................ | 340/321 |
| 7,229,188 | B2 | * | 6/2007 | Mah .............................. | 362/192 |
| 2009/0152990 | A1 | * | 6/2009 | Brown et al. ................. | 310/339 |

FOREIGN PATENT DOCUMENTS

| | | | |
|---|---|---|---|
| CN | 1696499 A | 11/2005 | |
| CN | 1953305 A | 4/2007 | |
| CN | 201356100 Y | 12/2009 | |
| WO | WO 2009057178 A1 * | 5/2009 | ............... B60Q 7/00 |

* cited by examiner

*Primary Examiner* — Peggy Neils
*Assistant Examiner* — William N Harris

(57) ABSTRACT

The invention discloses a power generating device comprising a first shell, a magnetic unit, a second shell and an inductance coil. The first shell comprises at least a first engaging part. The magnetic unit is disposed on the first shell. The second shell comprises at least a second engaging part which is detachably engaged to the first engaging part making the first shell and the second shell form a space, wherein the magnetic unit is disposed inside the space. The inductance coil is disposed on the second shell inside the space, and the magnetic unit is surrounded by the inductance coil. When an external force is applied to the first shell and the second shell, the first engaging part moves relatively to second engaging part, and the inductance coil generates an induced current by sensing changes of a magnetic flux.

12 Claims, 5 Drawing Sheets

POWER GENERATING DEVICE

BACKGROUND OF THE INVENTION

1. Field of the Invention

The present invention is related to a power generating device, more particularly, the present invention is related to a power generating device utilizing the electromagnetic induction to generate electrical energy.

2. Description of the Prior Art

In order to promote green energy with current world trend, there were many products with both practicability and energy-efficiency on the market. The commodity of utilizing simple actions of people for generating electrical energy can not only achieve the effect of energy saving, but also have a memorable fun in use. For example, the flashlight with generating electrical energy by hand and the bicycle with changing mechanical energy into electrical energy are the practical products with the function of generating electricity.

On the other hand, when the pedestrians walk at night, if the surrounding ambient light is weak, the traffic accidents are very easily taken place. Therefore, the pedestrians often need to be equipped with the fittings with easily reflecting light or capable of emitting light, to increase the recognition in the evening. Because the fittings with emitting light need to be carried on the body, a thin battery must usually be installed. However, the thin battery containing the mercury always leads to pollute the environment. In addition, if the above fittings do not have good waterproof equipments, the battery is easily leakage, damp or damaged.

In summary, if the light fittings can be used with the electrical energy generated by a simple action of people, have simple internal structure and do not require high specification waterproof equipments, the fittings will not need to have the mercury battery with high pollution, and are more conducive to be worn by pedestrians in any condition of weather and improve pedestrian traffic safety. Therefore, the said fittings are highly practical with various vendors' active research.

SUMMARY OF THE INVENTION

One scope of the present invention is to provide a power generating device, which can utilize a simple action of people to generate electrical energy, do not need to have the mercury battery with high pollution, generate a LED source, and increase the traffic safety for people.

According to an embodiment of the present invention, the power generating device of the present invention comprises a first shell, a magnetic unit, a second shell, an inductance coil and a power saving module. The first shell comprises at least a first engaging part. The magnetic unit is disposed on the first shell. The second shell comprises at least a second engaging part, wherein the second engaging part is detachably engaged to the first engaging part for making the first shell and the second shell to form a space. The magnetic unit is configured in the said the space. The inductance coil is disposed on the second shell inside the said space and surrounded the magnetic unit. The power saving module electronically is connected to the inductance coil for receiving the induced current generated by the inductance coil and saving as an electrical energy. When an external force is applied to the first shell and the second shell, the first engaging part moves relatively to the second engaging part, and the inductance coil generates an induced current by sensing changes of a magnetic flux.

In actual practice, the power generating device of the present invention further comprises an elastic unit. The elastic unit is configured between the first shell and the second shell for providing a restoring force to resist the external force as the external force is applied to the first shell and the second shell. Moreover, the power generating device further comprises a third shell. The third shell is connected to the first shell, and the third shell comprises a third engaging part for engaging to the first engaging part, wherein when the external force is applied to the first shell and the second shell, the first shell, the second shell and the third shell move relatively to each other. Moreover, the third shell is a bowl-shaped structure, and the second shell is configured in the third shell. The elastic unit is configured between the second shell and the third shell for providing a restoring force to resist the external force while the second shell and the third shell move relatively to each other.

Moreover, in actual practice, the power generating device of the present invention further comprises a lighting module. The lighting module is electronically connected to the power saving module and comprises at least a LED unit, wherein the power saving module provides the electrical energy to the LED unit.

In summary, the power generating device of the present invention is able to have the application in shoe-pads, ground mats or any other suitable device, while the user steps or presses the power generating device. The power generating device utilizes the electromagnetic induction to generate the induced current and further saves the said the induced current for supplying to LED. Therefore, the power generating device of the present invention is able to be configured in the shoes easily and generates the electrical energy automatically in the process of walking. More particularly, the lighting module of the power generating device of the present invention is able to increase the recognition for the user in the evening, so as to increase the traffic safety for the user.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

Figure 1:
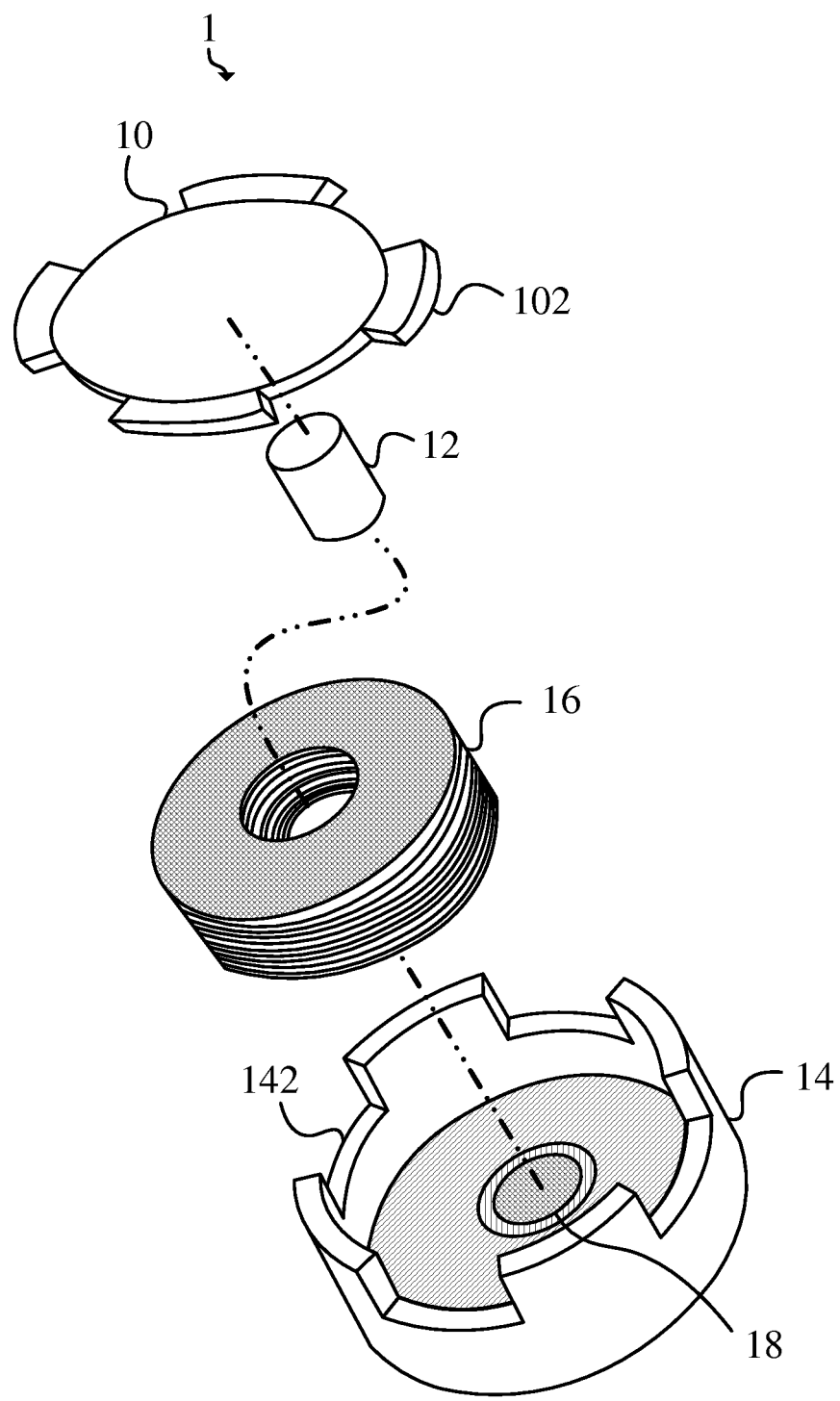
FIG. 1 is an exploded view of the power generating device of one embodiment of the present invention.

Please refer to FIG. 1, FIG. 1 is an exploded view of the power generating device of one embodiment of the present invention. As shown in FIG. 1, the power generating device 1 comprises a first shell 10, a magnetic unit 12, a second shell 14 and a inductance coil 16. Moreover, the first shell 10 and the second shell 14 are able to engage to each other so as to form a space, the magnetic unit 12 and the inductance coil 16 are configured in the said space. For more detailed description of the above components and the functions thereof, please read the followings.

The first shell 10 comprises at least a first engaging part 102. In actual practice, the first engaging part 102 can be a component disposed on the first shell. Besides, the first engaging part 102 can also be formed with the first shell 10 in one body. Moreover, the first engaging part 102 is not limited to a fan-shaped component, the first engaging part 102 is able to be any other suitable shape.

The magnetic unit 12 is disposed on the first shell 10. In actual practice, the magnetic unit 12 is configured in the space formed by the first shell 10 and the second shell 14, and disposed on the surface of the first shell 10. Moreover, the material of the magnetic unit 12 is not limited, for example, the magnetic unit 12 is able to be a high magnetic magnet made of rubidium iron boron or other suitable material, the component which is able to provide magnetism should all belong to the scope of the present invention.

The second shell 14 comprises at least a second engaging part 142. The second engaging part 142 is detachably engaged to the first engaging part 102 for making the first shell 10 and the second shell 14 closely to form the said the space. Moreover, the second engaging part 142 is a shape utilized to engage the first engaging part 102. As shown in FIG. 1, the first shell 10 is able to be an upper cover, the second shell 14 is able to be a bowl-shaped structure, the first engaging part 102 and the second engaging part 142 are utilized to guide the direction of the relative motion of the first shell 10 and the second shell 14. Therefore, the first engaging part 102 and the second engaging part 142 are able to further be a corresponding groove, slide rail or other suitable structure for making the first shell 10 and the second shell 14 move relatively to each other.

The inductance coil 16 is disposed on the second shell 14 inside the said space, and surrounded the magnetic unit 12. When an external force is applied to the first shell 10 and the second shell 14, the first engaging part 102 moves relatively to the second engaging part 142, so as to make the inductance coil 16 generate an induced current by sensing changes of a magnetic flux of the magnetic unit 12. In actual practice, the inductance coil 16 surrounds the outside of the magnetic unit 12, when the magnetic unit 12 moves relatively to the inductance coil 16 because of the external force, the inductance coil 16 is able to sense the changes of the magnetic flux generated by the motion relative to the magnetic unit 12 and generate the induced current.

Figure 2A:
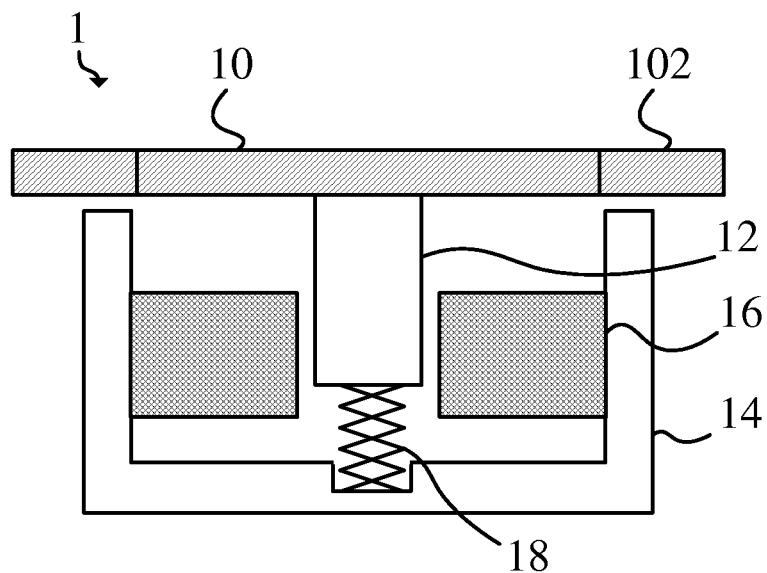
FIG. 2A is a section view of the power generating device without suffering the external force of one embodiment of the present invention.
Figure 2B:
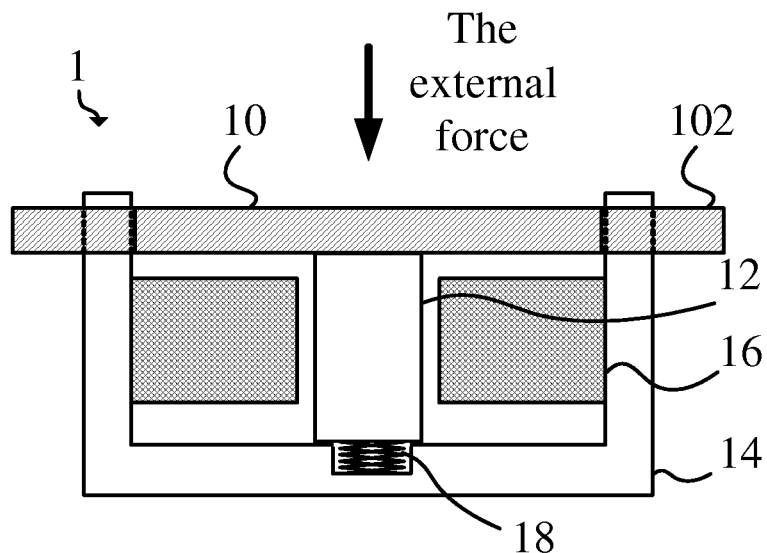
FIG. 2B is a section view of the power generating device with suffering the external force of one embodiment of the present invention.

In actual practice, the power generating device 1 of the present invention further comprises an elastic unit, when the external force is applied to the first shell 10 and the second shell 14, the said elastic unit is capable of providing a restoring force to resist the external force. Please refer to FIG. 1, FIG. 2A and FIG. 2B, FIG. 2A is a section view of the power generating device without suffering the external force of one embodiment of the present invention. FIG. 2B is a section view of the power generating device with suffering the external force of one embodiment of the present invention. As shown in figures, the power generating device 1 further comprises an elastic unit 18. The elastic unit 18 is configured in the space formed by the first shell 10 and the second shell 14, when the external force is applied to the first shell 10 and the second shell 14, the elastic unit 18 provides a restoring force to resist the external force. For example, when the external force as shown in FIG. 2B is applied to the power generating device 1, the first shell 10 and the second shell 14 move relatively to each other and generate a displacement, wherein the direction of motion and displacement is guided by the first engaging part 102 and the second engaging part 142. In the embodiment of the present invention, the direction of motion and displacement of the first shell 10 and the second shell 14 is parallel to the direction of the external force.

In the other words, when the power generating device 1 has not suffered the external force, the magnetic circuit formed by the magnetic unit 12 and the inductance coil 16 is unclosing, at the time the magnetic flux is less; oppositely, when the power generating device 1 has suffered the external force, the magnetic circuit formed by the magnetic unit 12 and the inductance coil 16 is closing, at the time the magnetic flux is larger, and the changes of the magnetic flux is able to make the inductance coil 16 generate the induced current or voltage. In actual practice, for the purpose of providing a larger change of the magnetic flux, the elastic unit 18 is able to be embedded in the second shell 14 as shown in figure for making the magnetic unit 12 and the second shell 14 close tightly as the magnetic circuit closes. However, the present invention is not limited to the above approach, the elastic unit 18 can still achieve the effect even though the elastic unit 18 is not embedded the second shell 14. The second shell 14 could be made by the material of permeability or any material with magnetic conductivity.

It is worthy to be noticed, if the elastic unit 18 is configured in the space formed by the first shell 10 and the second shell 14 and can provide a restoring force to resist the external force, it will match the spirit of the present invention. The position in the space of the elastic unit 18 configured is not limited in the present invention. In actual practice, the elastic unit 18 can be a spring or any other elastic objects.

Figure 3:
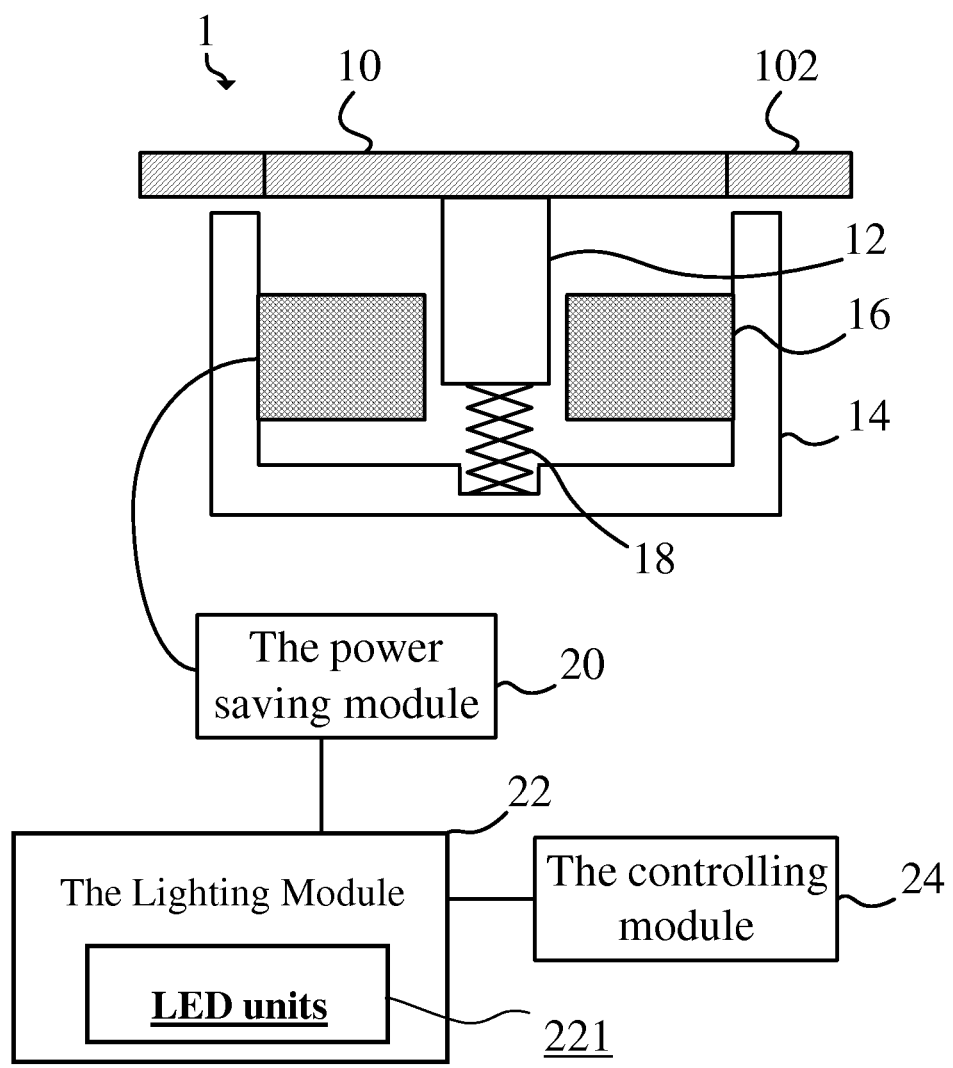
FIG. 3 is a schematic diagram of the power generating device of another embodiment of the present invention.

Moreover, in actual practice, the power generating device 1 of the present invention is able to be configured on shoe-pads, ground mats, footplate or any other suitable device, and further comprises a lighting module, a power saving module and a controlling module, for making more efficient application of the generated power. For example, please refer to FIG. 3, FIG. 3 is a schematic diagram of the power generating device of another embodiment of the present invention. As shown in figure, the power generating device 1 further comprises a power saving module 20, a lighting module 22 and a controlling module 24. The power saving module 20 is electronically connected to the inductance coil 16 for receiving the induced current generated by the inductance coil 16 and saving as an electrical energy. Moreover, the electrical energy saved by the power saving module 20 is able to further provide to the lighting module 22 and the controlling module 24.

The lighting module 22 comprises at least a LED unit, and the power saving module 20 provides the electrical energy to the lighting module 22 for making the said LED unit emit light. The controlling module 24 is electronically connected to the lighting module 22, for controlling the lighting frequency, color or figure of the lighting module 22. In other words, the power generating device 1 of the present invention is able to be applied in the LED source using the electrical energy generated by foot step, and utilized the external force to the shoe-pad or ground mat in people walking to make the LED emit light, becomes a green product with none external electrical energy or battery.

It is worthy to be noticed, in the embodiment of the present invention, the external force is applied on the first shell 10, and the second shell 14 is fixed on the shoe-pads, ground mats, footplate or any other suitable device for making the first shell 10 move relatively to the second shell 14 as the external force is applied to the first shell 10. However, the present invention is not limited to the above approach, in other words, the external force can further be applied to the second shell 14, as long as the external force is able to make the first shell 10 and the second shell 14 move relatively to each other, would belong to the present invention.

Figure 4:
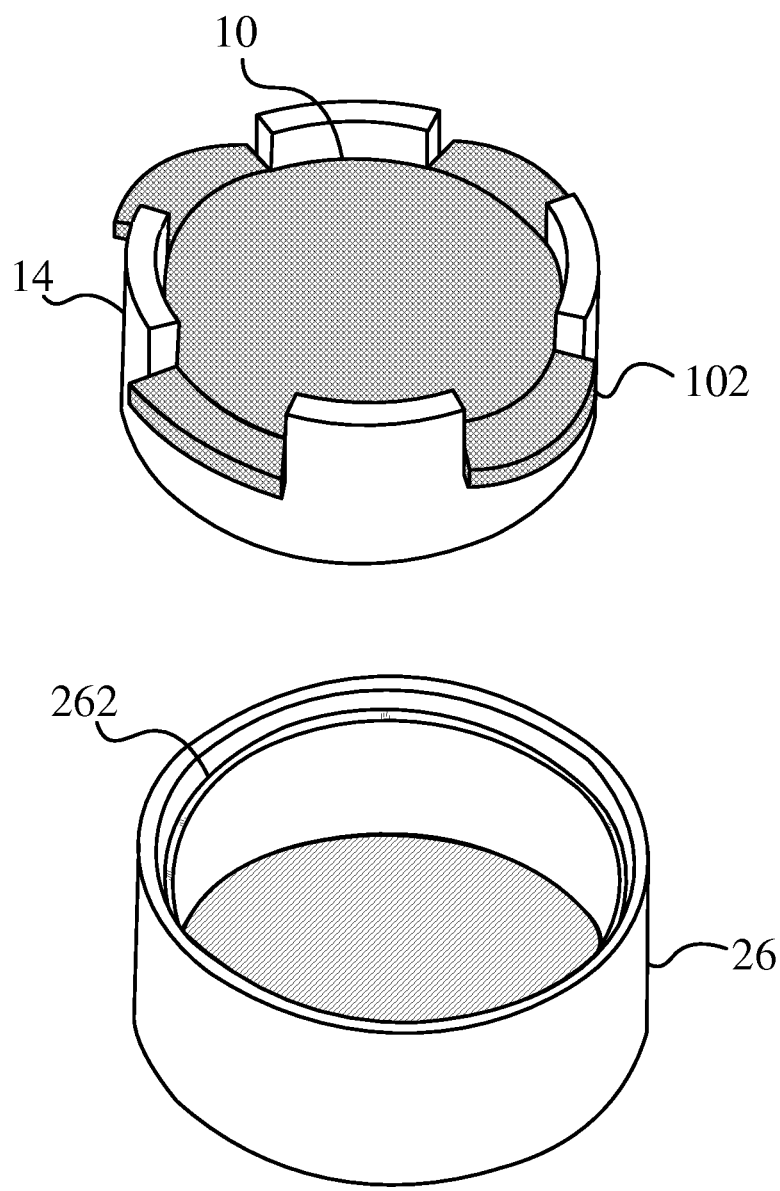
FIG. 4 is a schematic diagram of the power generating device of another embodiment of the present invention.
Figure 5A:
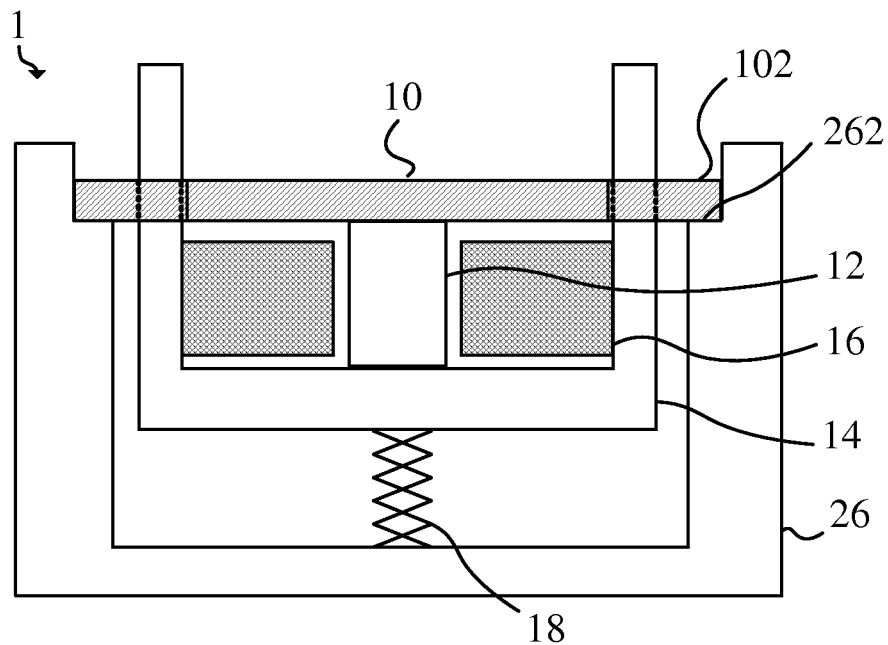
FIG. 5A is a section view of the power generating device without suffering the external force of another embodiment of the present invention.
Figure 5B:
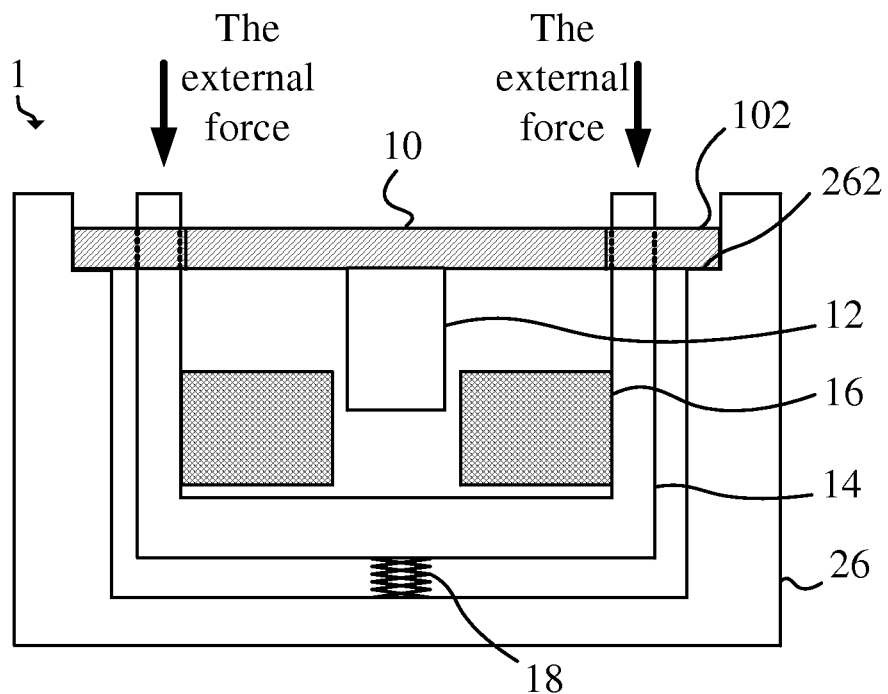
FIG. 5B is a section view of the power generating device with suffering the external force of another embodiment of the present invention.

For example, in another embodiment of the present invention, the power generating device 1 further comprises a third shell. The external force is able to be applied to the second shell 14 of the power generating device 1. Please refer to FIG. 4, FIG. 5A and FIG. 5B, FIG. 4 is a schematic diagram of the power generating device of another embodiment of the present invention. FIG. 5A is a section view of the power generating device without suffering the external force of another embodiment of the present invention. FIG. 5B is a section view of the power generating device with suffering the external force of another embodiment of the present invention. As shown in figure, the power generating device 1 further comprises a third shell 26, the third shell 26 is connected to the first shell 10, and the third shell 26 comprises a third engaging part 262 for engaging to the first engaging part 102.

When the external force is applied to the second shell 14, owing to the third engaging part 262 for holding the first engaging part 102, which means there is not any relative motion between the third shell 26 and the first shell 10, the external force makes the second shell 14 move relatively to the first shell 10 and the third shell 26. Different to FIG. 1, FIG. 2A and FIG. 2B, in this embodiment, the elastic unit 18 is configured between the second shell 14 and the third shell 26, the elastic unit 18 provides the restoring force to resist the external force while the second shell It is worthy to be noticed, in the embodiment of the present invention, the external force is applied on the opening end face of the second shell 14 and pushes the second shell 14 move relatively to the third shell 26. Therefore, the elastic unit 18 which is configured between the second shell 14 and the third shell 26 for providing a restoring force to resist the external force would match the spirit of the present invention. The position in the space of the elastic unit 18 configured is not limited in the present invention.

Different to FIG. 2, while the power generating device 1 in FIG. 2 suffers the external force and pushes the magnetic unit 12 into the inductance coil 16, because of the effect of magnetism, the magnetic unit 12 needs the elastic unit 18 to provide the restoring force to move toward the outside of the inductance coil 16. In the other hand, if the power generating device 1 in FIG. 5 eliminates the elastic unit 18, the present invention can still achieve the effect. In actual practice, while the power generating device 1 in FIG. 5 suffers the external force and pulls the magnetic unit 12 from the inductance coil 16, the magnetic unit 12 is able to restore to the position which the power generating device have not suffered the external force with the aid of magnetism, in other words, in the embodiment, the elastic unit 18 is just an assistant component, not a component for necessary.

In summary, the power generating device of the present invention is able to have the application in shoe-pads, ground mats or any other suitable device, utilized the external force applied to the shoe-pad or ground mat in people walking to generate the electrical energy and save the electrical energy or supply the electrical energy to the energy-consuming device such as LED. In other words, as the other suitable energy-consuming device integrating with the power generating device of the present invention, the present invention becomes a green product with none external electrical energy or battery. Moreover, the power generating device of the present invention is able to be configured in the shoes easily and generate the electrical energy automatically in the process of people walking. More particularly, the lighting module of the power generating device of the present invention is able to increase the recognition for the user in the evening, so as to increase the traffic safety for the user.

Although the present invention has been illustrated and described with reference to the preferred embodiment thereof, it should be understood that it is in no way limited to the details of such embodiment but is capable of numerous modifications within the scope of the appended claims.

What is claimed is:

1. A power generating device, comprising:
   a first shell, comprising a plurality of first engaging parts integrally formed on a radial surface of the first shell and extending outward horizontally therefrom, the plurality of first engaging parts having an opening formed therebetween;
   a magnetic unit fixed on the first shell;
   a second shell, comprising an indentation and at least a second engaging part integrally formed therewith, the second engaging part formed on a top surface of the second shell corresponding to the first shell, the second engaging part extending outward vertically from the top surface, the second engaging part detachably engage with the first engaging part so as to form a space between the first shell and the second shell, wherein the magnetic unit is disposed inside the space;
   an inductance coil, disposed on the second shell inside the space; and
   an elastic unit embedded in the indentation of the second shell, rather than configured between the first engaging part and the second engaging part;
   wherein, when an external force is applied, the first engaging part moves vertically relative to the second engaging part and at least part of the second engaging part enters the opening vertically during the movement, the inductance coil generates an induced current by sensing changes of a magnetic flux, at least part of the magnetic unit being surrounded by the inductance coil before and after the external force is applied.

2. The power generating device of claim 1, further comprising:
   a power saving module, electronically connected to the inductance coil, for receiving the induced current generated by the inductance coil and saving as an electrical energy.

3. The power generating device of claim 1, further comprising:
   a third shell, connected to the first shell, comprising a third engaging part for engaging to the first engaging part;
   wherein when the external force is applied, the second shell and the third shell move relative to each other.

4. The power generating device of claim 3, wherein the third shell is a bowl-shaped structure, and the second shell is configured in the third shell.

5. The power generating device of claim 4, further comprising:
   an elastic unit, configured between the second shell and the third shell, for providing a restoring force to resist the external force while the second shell and the third shell move relative to each other.

6. The power generating device of claim 3, wherein the third engaging part is a convex ring, disposed on the third shell, for holding the first engaging part.

7. The power generating device of claim 2, further comprising:

a lighting module, electronically connected to the power saving module and comprising at least a LED unit, wherein the power saving module provides the electrical energy to the LED unit.

8. The power generating device of claim 1, further comprising:
a controlling module, electronically connected to a lighting module, for controlling the lighting frequency, color or figure of the lighting module.

9. The power generating device of claim 1, wherein the first engaging part is a convex structure, the second engaging part is a concave structure, and the convex structure and the concave structure are utilized to engage to each other.

10. The power generating device of claim 1, wherein the first engaging part and the second engaging part comprise a slide rail structure, the first engaging part and the second engaging part move relative to each other along the slide rail structure.

11. A power generating device, comprising:
a first shell, comprising at least a first engaging part integrally formed therewith;
a magnetic unit, fixed on the first shell;
a second shell, comprising at least a second engaging part integrally formed therewith, the second engaging part detachably engaged with the first engaging part so as to form a space between the first shell and the second shell, wherein the magnetic unit is disposed inside the space;
a third shell, having an accommodating portion for accommodating the first shell and the second shell therein, the third shell comprising a third engaging part for engaging to the first engaging part; and
an inductance coil, disposed on the second shell inside the space;
wherein, when an external force is applied, the second shell moves relative to the first shell and the third shell, and there is no relative motion between the first shell and the third shell; the inductance coil generates an induced current by sensing changes of a magnetic flux, and at least part of the magnetic unit being surrounded by the inductance coil before and after the external force is applied to the second shell.

12. The power generating device of claim 11, further comprising an elastic unit, configured between the second shell and the third shell, for providing a restoring force to resist the external force while the second shell and the third shell move relative to each other.

* * * * *